(12) United States Patent
Budianu et al.

(10) Patent No.: US 9,130,816 B2
(45) Date of Patent: Sep. 8, 2015

(54) SYSTEM AND METHOD FOR TRANSMITTING AND RECEIVING SIGNAL WITH QUASI-PERIODIC PULSE SEQUENCE

(71) Applicant: QUALCOMM Incorporated, San Diego, CA (US)

(72) Inventors: Petru Cristian Budianu, San Diego, CA (US); Jun Shi, Fremont, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/250,259

(22) Filed: Apr. 10, 2014

(65) Prior Publication Data

US 2014/0219395 A1    Aug. 7, 2014

Related U.S. Application Data

(62) Division of application No. 12/887,101, filed on Sep. 21, 2010, now Pat. No. 8,774,252.

(60) Provisional application No. 61/348,899, filed on May 27, 2010.

(51) Int. Cl.
*H03K 9/00* (2006.01)
*H04L 25/49* (2006.01)
(Continued)

(52) U.S. Cl.
CPC .............. *H04L 25/49* (2013.01); *H04B 1/7174* (2013.01); *H04B 1/7183* (2013.01); *H04B 2001/6908* (2013.01)

(58) Field of Classification Search
CPC ................ H04B 1/7174; H04B 1/7183; H04B 2001/6908; H04B 1/7115; H04B 1/7117; H04B 1/712; H04B 1/707; H04B 1/7107; H04L 25/49
USPC ......... 375/138, 130, 131, 132, 135, 136, 316, 375/295
See application file for complete search history.

(56) References Cited

U.S. PATENT DOCUMENTS 7,002,934 B2    2/2006 Dolgonos et al.
7,558,537 B2    7/2009 Trachewsky et al.
(Continued)

FOREIGN PATENT DOCUMENTS

CN    101145890 A    3/2008
JP    2008092549 A    4/2008

OTHER PUBLICATIONS

International Preliminary Report on Patentability—PCT/US2011/038231, The International Bureau of WIPO—Geneva, Switzerland, Jul. 17, 2012.
(Continued)

*Primary Examiner* — Zewdu Kassa
(74) *Attorney, Agent, or Firm* — Paul S. Holdaway

(57) ABSTRACT

System and method are disclosed for synchronization of a transmitting device and a receiving device that communicate with each other via pulse modulation. The synchronization technique entails the transmitting device sending one or more quasi-periodic pulse sequences to the receiving device. A quasi-periodic pulse sequence is based on a substantially periodic pulse sequence, and may include some non-periodic pulses or not include some periodic pulses. The transmitting device may transmit frames each including a preamble that comprises one or more quasi-periodic pulse sequences, and a data payload that may comprise data. The receiving device receives the signal, generates samples of the signal, and detects the quasi-periodic pulse sequences in the received signal by analyzing samples based on a sample associated with a pulse and the period associated with the substantially periodic pulse sequence. The receiving device is further able to detect frames based on the detection of the sequence, and extract data therefrom.

20 Claims, 8 Drawing Sheets

(51) Int. Cl.
*H04B 1/717* (2011.01)
*H04B 1/7183* (2011.01)
*H04B 1/69* (2011.01)

(56) References Cited

U.S. PATENT DOCUMENTS

| | | |
|---|---|---|
| 2002/0035438 A1* | 3/2002 | Prince .............................. 702/77 |
| 2002/0137464 A1 | 9/2002 | Dolgonos et al. |
| 2006/0200034 A1* | 9/2006 | Ricci et al. .................... 600/513 |
| 2006/0274707 A1 | 12/2006 | Voinot et al. |
| 2006/0274853 A1 | 12/2006 | Schilling |
| 2008/0063044 A1 | 3/2008 | Iida |
| 2009/0285269 A1* | 11/2009 | Zhang et al. .................. 375/150 |
| 2010/0086073 A1 | 4/2010 | Jia et al. |
| 2011/0228875 A1 | 9/2011 | Trachewsky et al. |
| 2011/0292972 A1 | 12/2011 | Budianu et al. |

OTHER PUBLICATIONS

International Search Report and Written Opinion—PCT/US2011/038231, ISA/EPO—Sep. 7, 2011.

* cited by examiner

SYSTEM AND METHOD FOR TRANSMITTING AND RECEIVING SIGNAL WITH QUASI-PERIODIC PULSE SEQUENCE

CROSS-REFERENCE TO A RELATED APPLICATION

The present Application for Patent is a divisional of patent application Ser. No. 12/887,101, entitled "SYSTEM AND METHOD FOR TRANSMITTING AND RECEIVING SIGNAL WITH QUASI-PERIODIC PULSE SEQUENCE" filed Sep. 21, 2010, pending, claims benefit of U.S. Provisional Patent Application Ser. No. 61/348,899, entitled, "SYSTEM AND METHOD FOR TRANSMITTING AND RECEIVING SIGNAL WITH QUASI-PERIODIC PULSE SEQUENCE", filed May 27, 2010 which is assigned to the assignee hereof and hereby expressly incorporated by reference herein.

FIELD

The present disclosure relates generally to communication systems, and in particular, to a system and method for transmitting and receiving a signal including one or more quasi-periodic pulse sequences.

BACKGROUND

In communication systems, signals are often transmitted from a source communication device to a target communication device via a wireless medium. These communication devices typically employ a transmitter for transmitting signals long distances via the wireless medium. In many cases, the transmitter is operated continuously, whether or not signals are being transmitted. In some cases, operating a transmitter in a continuous manner may be acceptable. However, in other cases, especially when an associated power source is limited, it may not be desirable since the communication device may not be operated continuously for a long time.

For instance, many communication devices are portable, such as cellular telephones, personal digital assistants (PDAs), handheld products, and other devices. Portable communication devices typically rely on a limited power source, such as a battery, to perform the various intended operations. A limited power source typically has a continuous use life that depends on the amount of power used by the portable device. It is generally desirable to extend the continuous use life as much as possible. Accordingly, portable communication devices are more frequently designed to consume less and less power.

One technique for operating a transmitter in a more power efficient manner is to use pulse-based modulation techniques (e.g., pulse-position modulation) to transmit signals. In such systems, a transmitter may be operated in a relatively high power mode during the transmission of a pulse signal. However, when the transmitter is not being used to transmit the pulse signal, it is operated in a relatively low power mode in order to conserve power. Similarly, in such systems, a receiver may be operated in a relatively high power mode during the reception of the pulse signal, and operated in a relatively low power mode when not receiving the signal.

In order for the receiver to know when pulses are expected to arrive, techniques for synchronizing the transmission of the pulse signal between the transmitter and receiver are typically employed. One such technique is for the transmitter to transmit pulse sequences to the receiver, which has a priori knowledge of the sequences. If the pulse sequences are transmitted in an a priori manner, the reception of the signals may be synchronized with the transmission of the signals. This allows the receiver to know when pulses are expected to be received and not received, and thus may operate in the relatively high and low power modes accordingly.

SUMMARY

An aspect of the disclosure relates to a method of transmitting a signal, comprising generating a quasi-periodic pulse sequence based on a substantially periodic pulse sequence, and transmitting the signal comprising the quasi-periodic pulse sequence. In yet another aspect, the quasi-periodic pulse sequence comprises a sequence of pulses at a first rate, and wherein the substantially periodic pulse sequence comprises a sequence of pulses at a second rate different than the first rate.

According to another aspect, the first rate is greater than the second rate. In another aspect, the quasi-periodic pulse sequence is based on the substantially periodic pulse sequence plus one or more non-periodic pulses.

According to yet another aspect, the first rate is less than the second rate. In another aspect, the quasi-periodic pulse sequence is based on the substantially periodic pulse sequence minus one or more periodic pulses.

According to still another aspect, the pulses of the quasi-periodic pulse sequence are situated respectively within pulse intervals, and further wherein each pulse of the quasi-periodic pulse sequence is situated within a time hopping interval within each pulse interval. In another aspect, the first rate is used to define a communication channel via which the signal is transmitted. In yet another aspect, the method further comprises generating a frame comprising a preamble including the quasi-periodic pulse sequence and a data payload, wherein the transmitted signal, in turn, comprises the frame.

Another aspect of the disclosure relates to a method of processing a signal comprising receiving the signal, generating samples of the received signal, and detecting a quasi-periodic pulse sequence in the received signal by analyzing samples of the received signal, wherein the quasi-periodic pulse sequence is based on a substantially periodic pulse sequence. In another aspect, the detecting of the quasi-periodic pulse sequence comprises determining a first sample of the generated samples associated with a first pulse in the received signal, and performing a first analysis of samples of the generated samples based on the first sample and a period associated with the substantially periodic pulse sequence. In another aspect, performing the first analysis of the samples comprises analyzing samples of the generated samples that are integer multiple of the period from the first sample.

In yet another aspect, the detecting of the quasi-periodic pulse sequence further comprises determining whether the first analysis of the samples results in the detection of the quasi-periodic pulse sequence, determining a second sample of the generated samples associated with a second pulse in the received signal if the first analysis did not result in the detection of the quasi-periodic pulse sequence, and performing a second analysis of samples of the generated samples based on the second sample and the period associated with the substantially periodic pulse sequence.

In still another aspect, the method further comprises detecting a frame based on the detection of the quasi-periodic pulse sequence. In another aspect, the detecting of the frame is based on timing information associated with the detection of the quasi-periodic pulse sequence. In yet another aspect, the quasi-periodic pulse sequence is situated within a preamble of the frame, wherein the frame comprises a data payload, and the method further comprises extracting data from the data payload.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
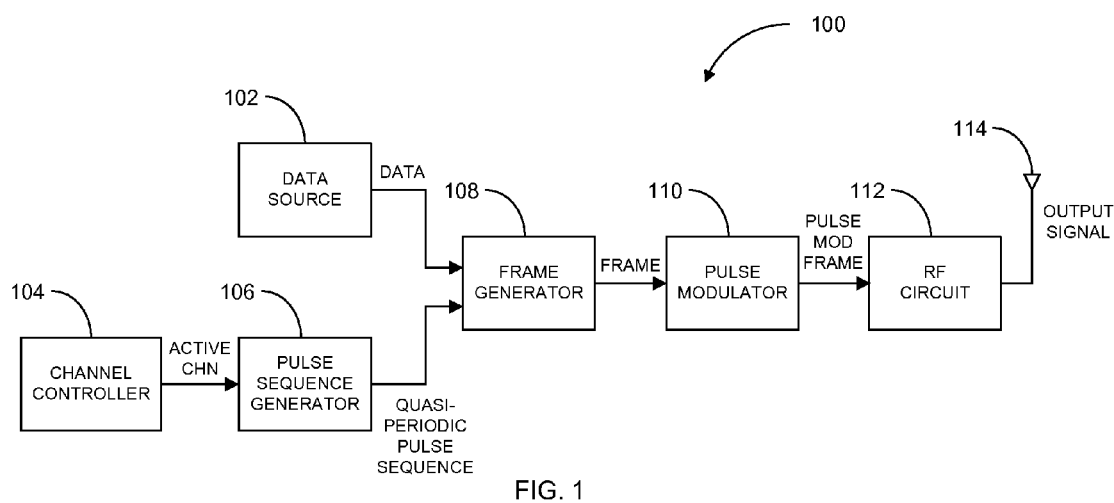
FIG. 1 illustrates a block diagram of an exemplary transmitter in accordance with an aspect of the disclosure.

FIG. 1 illustrates a block diagram of an exemplary transmitter 100 in accordance with an aspect of the disclosure. In summary, the transmitter 100 is adapted to generate and transmit a transmission frame comprising a preamble and a data payload. The preamble comprises one or more quasi-periodic pulse sequences used for synchronization of a receiver for detecting one or more frames. A quasi-periodic pulse sequence is based on a substantially periodic pulse sequence. In some aspect, the quasi-periodic pulse sequence comprises a sequence of pulses at a first rate, and the substantially periodic pulse sequence comprises a sequence of periodic pulses at a second rate different than the first rate. If the first rate is greater than the second rate, the quasi-periodic pulse sequence is based on the substantially periodic pulse sequence plus one or more non-periodic pulses. If, on the other hand, the first rate is less than the second rate, the quasi-periodic pulse sequence is based on the substantially periodic pulse sequence minus one or more periodic pulses. The pulses of the quasi-periodic pulse sequence reside respectively within periodic pulse intervals, each comprising a defined number of time hopping intervals. Accordingly, the period P0 of the pulse intervals is related to the first rate (e.g., first rate=1/P0). Each pulse may be an ultra-wideband (UWB) pulse.

In the case where the period P of the pulses of the substantially periodic pulse sequence is less than the period P0 of the pulse intervals (e.g., the first rate is less than the second rate), the transmission of one or more periodic pulses is suppressed within each pulse interval where two or more pulses would be situated in accordance with the period P. This is to ensure that only one pulse is transmitted per each pulse interval. Similarly, in the case where the period P of the pulses of the substantially periodic pulse sequence is greater than the period P0 of the pulse intervals (e.g., the first rate is greater than the second rate), the transmission of a dummy or non-periodic pulse is inserted within each pulse interval where there is an absence of a pulse in accordance with the period P. This is to ensure that each pulse interval includes a single pulse.

More specifically, the transmitter 100 comprises a data source 102, a channel controller 104, a pulse sequence generator 106, a frame generator 108, a pulse modulator 110, a radio frequency (RF) circuit 112, and an antenna 114. The data source 102 is adapted to generate data for the data payload of the transmitted frame. The channel controller 104 is adapted to assign the active channel for transmission of the frame. The active channel defines the period P for the pulses of the quasi-periodic pulse sequence. The pulse sequence generator 106 is adapted to generate one or more quasi-periodic pulse sequence based on the active channel.

The frame generator 108 is adapted to form a transmission frame comprising a preamble and a data payload. In this regards, the frame generator 108 is adapted to situate one or more quasi-periodic pulse sequences generated by the pulse sequence generator 106 into the preamble of the transmission frame. Additionally, the frame generator 108 is adapted to situate the data from the data source 102 into the data payload of the transmission frame. The pulse modulator 110 modulates the data frame to generate a pulse modulated frame. The RF module 112 generates an output RF signal comprising the pulse modulated frame for wireless transmission to a remote device via the antenna 114.

The pulse sequence generator 106 is but one example of a means for generating a quasi-periodic pulse sequence, which may be implemented as a circuit, processor, application specific integrated circuit (ASIC), programmable logic array (PLA), any combination thereof, or other electronics. The RF circuit 112 is but one example of a means for transmitting a signal, which may be implemented as a transmitter, circuit, processor, ASIC, PLA, any combination thereof, or other electronics. Similarly, the frame generator 108 is but one example of a means for generating a frame, which may be implemented as a circuit, processor, ASIC, PLA, any combination thereof, or other electronics.

Figure 2:
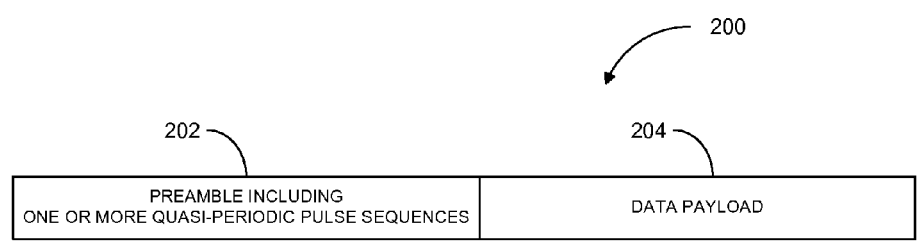
FIG. 2 illustrates a signal diagram of an exemplary frame in accordance with another aspect of the disclosure.

FIG. 2 illustrates a signal diagram of an exemplary transmission frame 200 in accordance with another aspect of the disclosure. As previously discussed, the transmission frame 200 comprises a preamble 202 and a data payload 204. The preamble comprises one or more quasi-periodic pulse sequences. The quasi-periodic pulse sequences may be arranged in a consecutive manner. The quasi-periodic pulse sequences assist an associated receiver with synchronization with and/or acquisition of the transmitted frame. The data payload 204 is reserved for data for transmission to the receiver. It shall be understood that the transmission frame 200 may include a data payload 204 that is empty (e.g., no data present in the data payload.)

Figure 3:
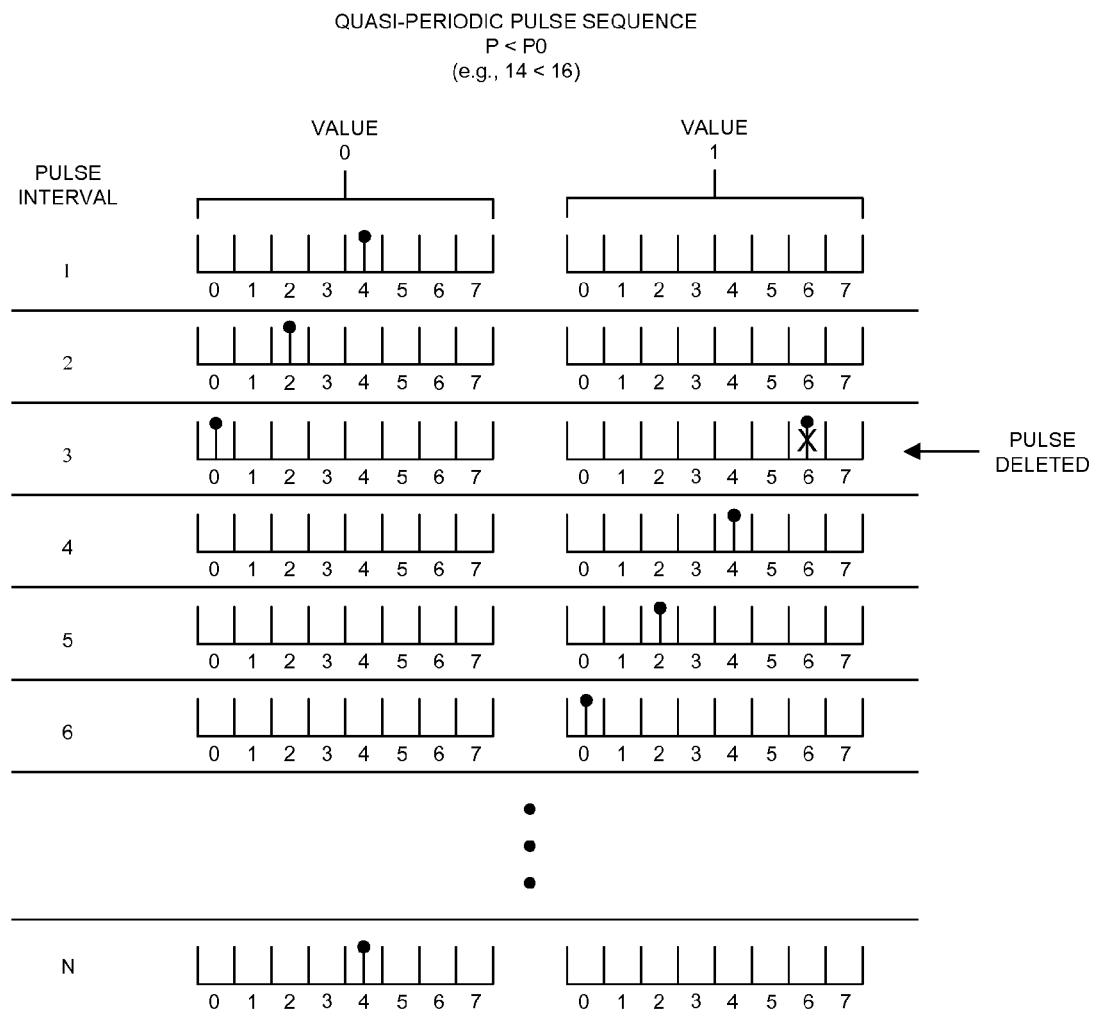
FIG. 3 illustrates a graph of an exemplary quasi-periodic pulse sequence in accordance with another aspect of the disclosure.

FIG. 3 illustrates a graph of an exemplary quasi-periodic pulse sequence in accordance with another aspect of the disclosure. In this example, there are N number (e.g., 64) of periodic pulse intervals in which pulses of the quasi-periodic pulse sequence are respectively sent. Each pulse interval includes eight (8) time hopping intervals reserved for a zero (0) bit value, and another eight (8) time hopping intervals are reserved for a one (b) bit value. Thus, the period P0 of the pulse interval is thus 16 time hopping intervals. Further, in accordance with this example, the period P of the pulses of the substantially periodic pulse sequence is 14 time hopping intervals. Thus, the period P of the pulses is less than the period P0 of the pulse intervals (or conversely, the rate of the periodic pulses is greater than the rate of the pulse intervals), which results in the scheduling of the transmission of two pulses within some pulse intervals.

For instance, considering this example, the first pulse is transmitted in time hopping interval four (4) of the bit zero (0) value of pulse interval one (1). Being that the pulse period is 14 time hopping intervals, the second pulse is transmitted in time hopping interval two (2) of the bit zero (0) value of pulse interval two (2). The third pulse is transmitted in time hopping interval zero (0) of the bit zero (0) value of pulse interval three (3). The fourth pulse is scheduled to be transmitted in time hopping interval six (6) of the bit one (1) value of pulse interval three (3). Accordingly, if the fourth pulse is transmitted, it would violate the rule against two or more pulses transmitted within a single pulse interval. Accordingly, in this example, the transmission of the fourth pulse is suppressed. It shall be understood that instead of suppressing the transmission of the fourth pulse, the transmission of the third pulse may be suppressed. The transmission of the quasi-periodic pulse sequence continues in this manner for the length of the sequence, and for subsequent pulse sequences, if any.

Figure 4:
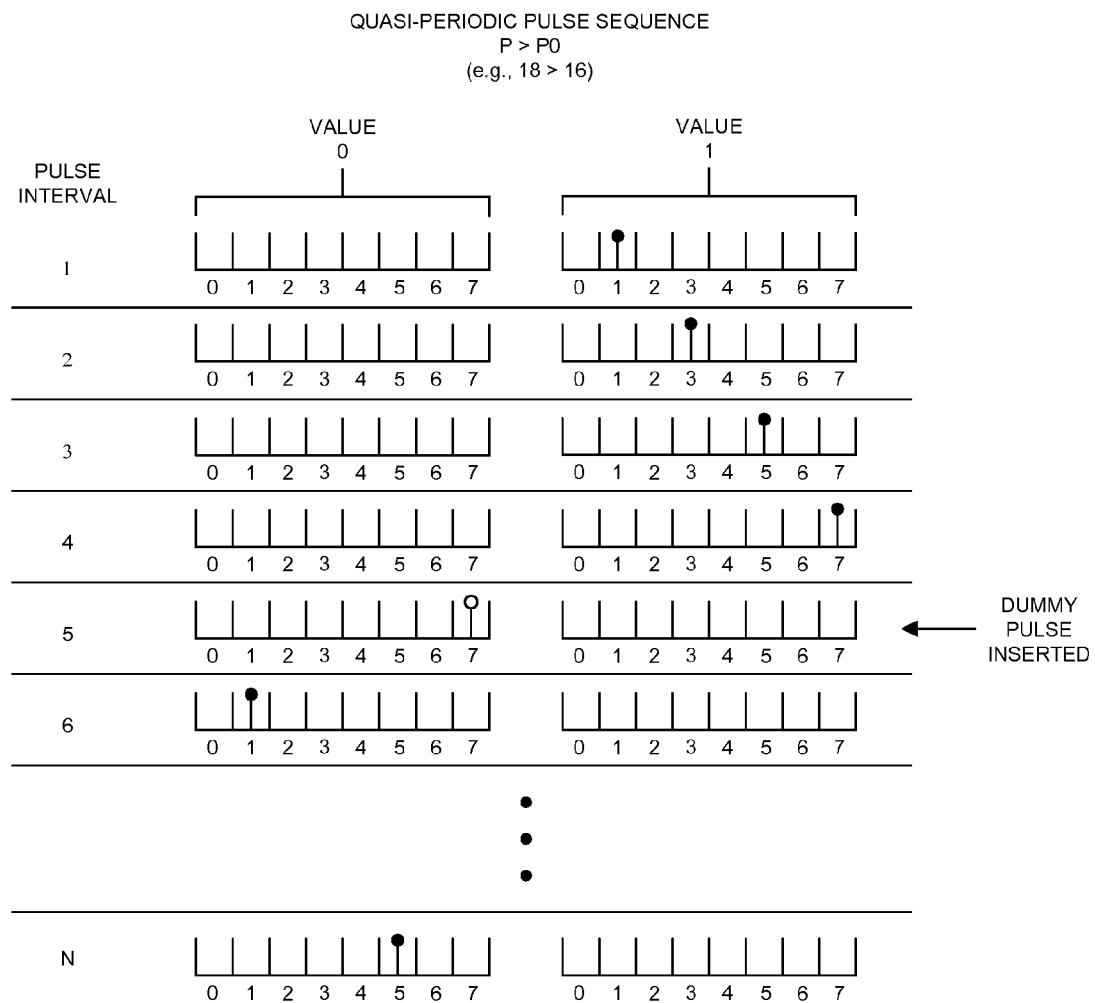
FIG. 4 illustrates a graph of another exemplary quasi-periodic pulse sequence in accordance with another aspect of the disclosure.

FIG. 4 illustrates a graph of another exemplary quasi-periodic pulse sequence in accordance with another aspect of the disclosure. In this example, the period P of the pulses of the substantially periodic pulse sequence is greater than the period P0 of the pulse intervals (or conversely, the rate of the periodic pulses is less than the rate of the pulse intervals). Accordingly, for each pulse interval in which a pulse is not scheduled to be transmitted in accordance with the period P, a dummy or non-periodic pulse (e.g., a pulse not used for synchronization by a receiver) is transmitted within such pulse interval. In this particular example, the period P of the pulses is 18 time hopping intervals, and the period P0 of the pulse interval is 16.

Considering this example, the first pulse is transmitted in time hopping interval one (1) of the bit one (1) value of pulse interval one (1). Being that the pulse period is 18 time hopping intervals, the second pulse is transmitted in time hopping interval three (3) of the bit one (1) value of pulse interval two (2). The third pulse is transmitted in time hopping interval five (5) of the bit one (1) value of pulse interval three (3). The fourth pulse is transmitted in time hopping interval seven (7) of the bit one (1) value of pulse interval four (4). Since the fifth pulse is scheduled to be transmitted in time hopping interval one (1) of the bit zero (0) value of pulse interval six (6), there is an absence of a pulse to be transmitted within pulse interval five (5). Accordingly, to comply with the rule of transmitting a pulse per each pulse interval, a dummy pulse is transmitted anywhere within pulse interval five (5). In this example, the dummy or non-periodic pulse is transmitted in time hopping interval seven (7) of the bit zero (0) value of pulse interval five (5). The transmission of the quasi-periodic pulse sequence continues in this manner for the length of the sequence, and for subsequent pulse sequences, if any.

Figure 5:
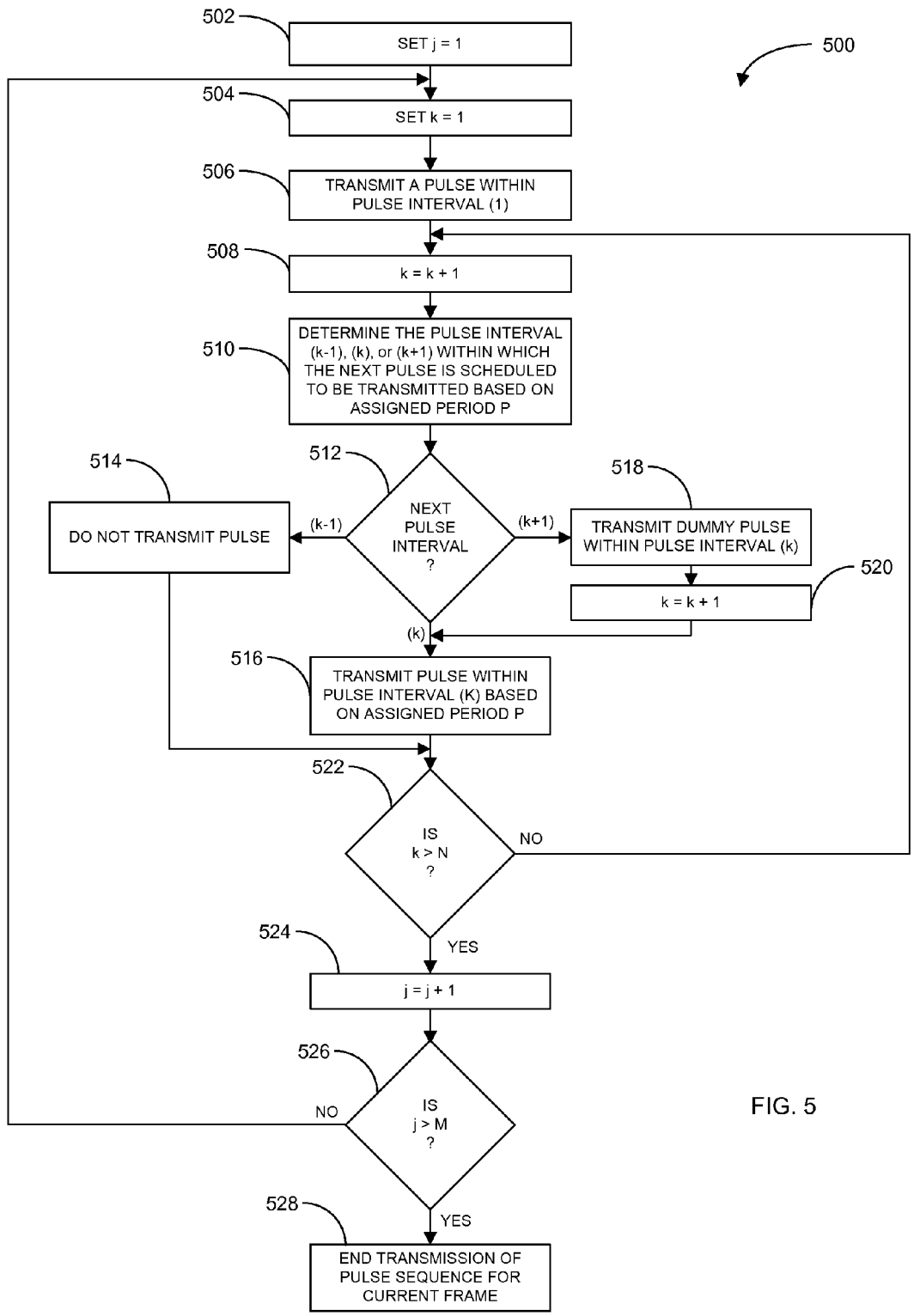
FIG. 5 illustrates a flow diagram of an exemplary method of transmitting a signal comprising one or more quasi-pulse sequences in accordance with another aspect of the disclosure.

FIG. 5 illustrates a flow diagram of an exemplary method 500 of transmitting a frame with a preamble comprising one or more quasi-periodic pulse sequences in accordance with another aspect of the disclosure. The method 500 is generic to the base substantially periodic pulse sequence having a period P greater or less than the period P0 of the pulse intervals. According to the method 500, the variable j, which represents the current pulse sequence being transmitted, is set to one (1) (block 502). Additionally, the variable k, which represents the current pulse interval within which a pulse of the current pulse sequence is transmitted, is also set to one (1) (block 504).

Then, a pulse is transmitted within pulse interval (1) (block 506). Then, the variable k is incremented by one (1) to identify the new or current pulse interval (block 508). Then, a determination is made as to whether the next pulse to be transmitted falls within the previous pulse interval (k−1), the current pulse interval (k), or the next pulse interval (k+1) (block 510). If the next pulse is scheduled to be transmitted within the previous pulse interval (k−1) as determined pursuant to block 512, the transmission of the next pulse is suppressed or cancelled (block 514). This prevents the transmission of two pulses within the previous pulse interval (k−1). From block 514, the method 500 proceeds to block 522.

If, on the other hand, the next pulse is scheduled to be transmitted within the current pulse interval (k) as determined pursuant to block 512, the transmission of the next pulse is performed within the current pulse period (k) (block 516). The method 500 then proceeds to block 522. If, however, the next pulse is scheduled to be transmitted within the next pulse interval (k+1) as determined pursuant to block 512, a dummy pulse is transmitted within the current pulse interval (k) (block 518). This is to ensure that a pulse is transmitted per each pulse interval. Then, the variable k is incremented so that it identifies the next pulse interval (k+1) as the current pulse interval (k) (block 520). Then, the transmission of the next pulse is performed within the "new" current pulse period (k) (block 516). The method 500 then proceeds to block 522.

In block 522, a determination is made as to whether the variable k is greater than N (e.g., 64), the number of pulse intervals in the pulse sequence. If the variable k is not greater than N as determined per block 522, which means that not all the pulses of the current pulse sequence (j) have been transmitted, the method 500 proceeds to block 508 to repeat the process associated with the transmission of the next pulse as previously discussed. If, on the other hand, the variable k is greater than N as determined per block 522, which means that all of the pulses of the current pulse sequence (j) have been transmitted, the variable j is incremented so that it identifies the next pulse sequence to be transmitted (block 524).

In block 526, a determination is made as to whether the variable j is greater than M, the number of pulse sequences in the preamble of a frame (block 526). If the variable j is not greater than M as determined per block 526, which means that not all the pulse sequences in the current frame have been transmitted, the method 500 proceeds to block 504 to repeat the process associated with the transmission of the next pulse sequence. If, on the other hand, the variable j is greater than M as determined per block 526, which means that all of the pulse sequences of the current frame have been transmitted, the transmission of the pulse sequences end for the current frame (block 528).

Figure 6:
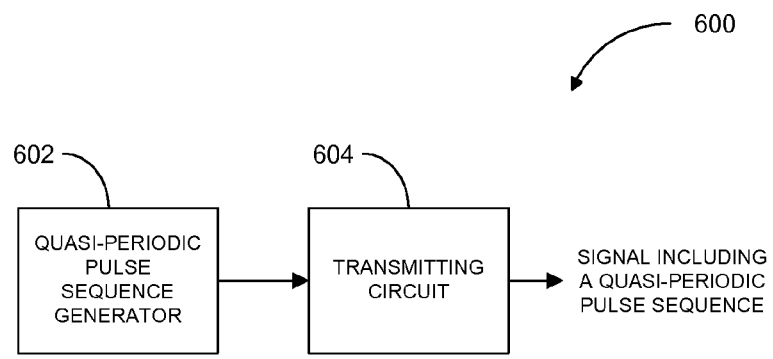
FIG. 6 illustrates a block diagram of an exemplary apparatus for transmitting a signal in accordance with another aspect of the disclosure.

FIG. 6 illustrates a block diagram of an exemplary apparatus 600 for transmitting a signal in accordance with another aspect of the disclosure. The apparatus 600 comprises a quasi-periodic pulse sequence generator 602, and a transmitting circuit 604. The quasi-periodic pulse sequence generator 602 is adapted to generate a quasi-periodic pulse sequence based on a substantially periodic pulse sequence. And, the transmitting circuit 602 is adapted to transmit a signal including the quasi-periodic pulse sequence. Accordingly, a means for generating the quasi-periodic pulse sequence may comprise a generator, processor or a circuit, and the means for transmitting the signal may comprise a transmitter.

Figure 7:
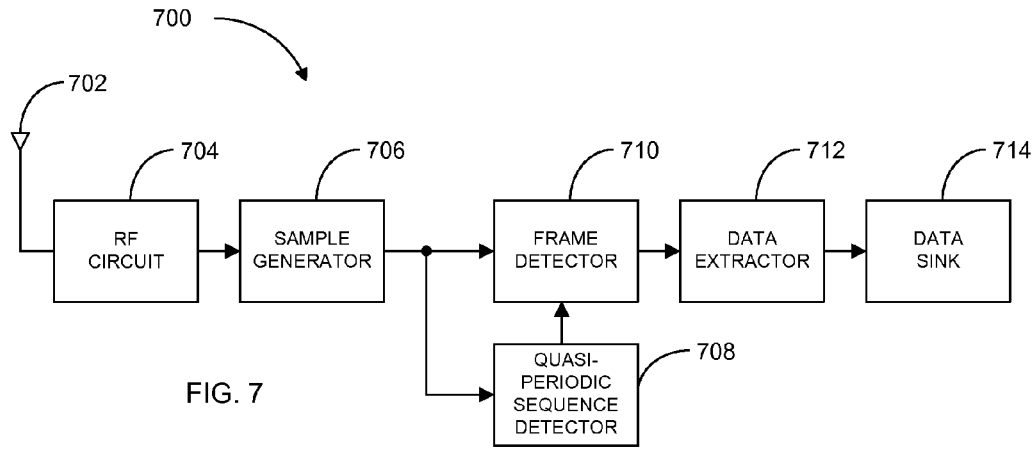
FIG. 7 illustrates a block diagram of an exemplary receiver in accordance with another aspect of the disclosure.

FIG. 7 illustrates a block diagram of an exemplary receiver 700 in accordance with another aspect of the disclosure. In summary, the receiver 700 is adapted to detect one or more quasi-periodic sequences in one or more frames of a received signal, use timing information derived from the detection of the one or more quasi-periodic sequences to detect the one or more frames, and extract data (if any) from the detected one or more frames, and provide the data (if any) to a data sink.

In particular, the receiver 700 comprises an antenna 702, an RF circuit 704, a sample generator 706, a quasi-periodic pulse sequence detector 708, a frame detector 710, a data extractor 712, and a data sink 714. The antenna 702 picks up a received signal transmitted from a remote device via a wireless medium. The received signal comprises one or more frames, wherein each frame includes a preamble and a data payload. The preamble comprises one or more quasi-periodic pulse sequences, and the data payload may have pulse modulated data. The RF circuit 704 processes (e.g., amplifies, filters, downconverts, and/or others) the received signal. The sample generator 706 generates samples of the processed received signal.

As discussed in more detail below, the quasi-periodic pulse sequence detector 708 is adapted to detect the one or more quasi-periodic pulse sequences in each frame of the received signal, and generate timing information based on said detection. The frame detector 710 is adapted to detect the frames of the received signal based on the timing information provided by the quasi-periodic sequence detector 708. The data extractor 712 is adapted to extract the data from each frame by analyzing samples of the received signal within a data payload portion of the frame, and provide the extracted data to the data sink 714 for processing.

The RF circuit 704 is but one example of a means for receiving a signal, which may be implemented as a receiver, circuit, processor, ASIC, PLA, any combination thereof, or other electronics. The sample generator is but one example of a means for generating samples of the received signal, which may be implemented as a circuit, processor, ASIC, PLA, any combination thereof, or other electronics. The frame detector 710 is but one example of a means for detecting a frame, which may be implemented as a circuit, processor, ASIC, PLA, any combination thereof, or other electronics. The data extractor 712 is but one example of a means for extracting data from a frame, which may be implemented as a circuit, processor, ASIC, PLA, any combination thereof, or other electronics.

Similarly, the quasi-periodic sequence detector 708 is but one example of a means for detecting a quasi-periodic pulse sequence, which may be implemented as a circuit, processor, ASIC, PLA, any combination thereof, or other electronics. As discussed in more detail below, the means for detecting a quasi-periodic pulse sequence may comprise (1) means for determining a first sample of the generated samples received signal associated with a pulse in the received signal; (2) means for performing an analysis of the samples based on the first sample and a period associated with the substantially periodic pulse sequence; (3) means for determining whether the first analysis of the samples results in the detection of the quasi-periodic pulse sequence; (4) means for determining a second sample of the generated samples associated with a second pulse in the received signal if the first analysis did not result in the detection of the quasi-periodic pulse sequence; and (5) means for performing a second analysis of samples of the generated samples based on the second sample and the period associated with the substantially periodic pulse sequence. These means may be implemented as a circuit, processor, ASIC, PLA, any combination thereof, or other electronics.

Figure 8:
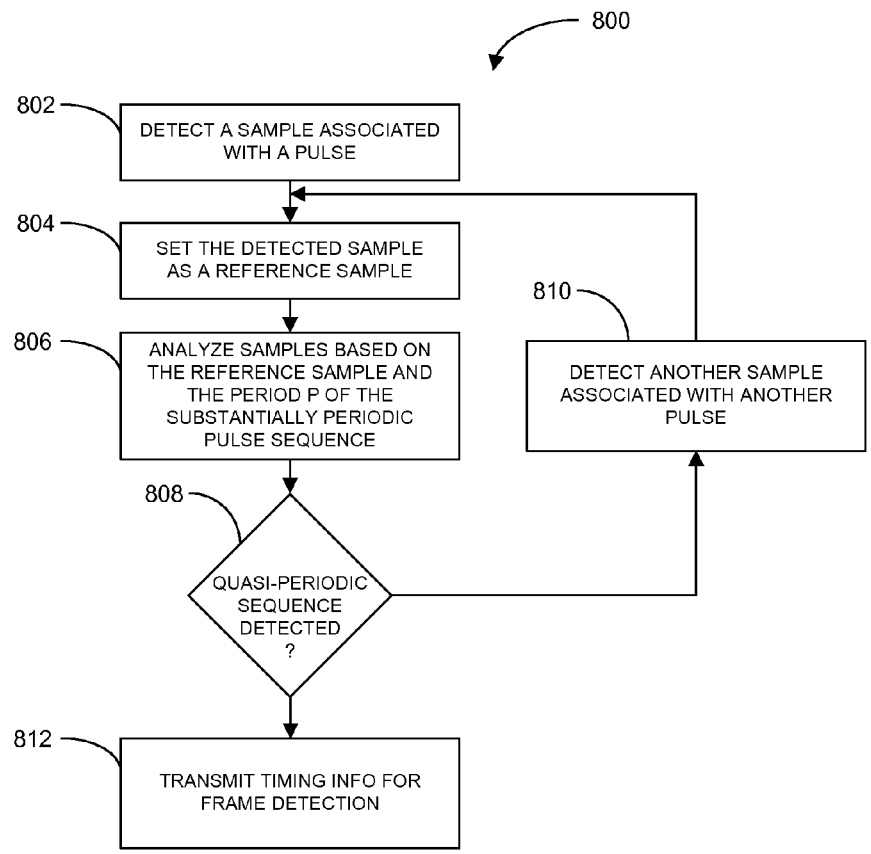
FIG. 8 illustrates a flow diagram of an exemplary method of detecting one or more quasi-periodic pulse sequences in a received signal in accordance with another aspect of the disclosure.

FIG. 8 illustrates a flow diagram of an exemplary method 800 of detecting one or more quasi-periodic pulse sequences in a received signal in accordance with another aspect of the disclosure. The method 800 may be implemented by the quasi-periodic sequence detector 708 or some other device. According to the method 800, the detector 708 detects a sample, from the samples generated by the sample generator 706, associated with a pulse in the received signal (block 802). The detector 708 then sets the sample as a reference sample (block 804). The detector 708 then analyzes samples to detect pulses based on the reference sample and a period P of the substantially periodic pulse sequence (block 806). For instance, the samples that may be analyzed are given by a+ bP, where a represents the reference sample, P is the period, in terms of samples, of the pulses of the substantially periodic pulse sequence, and b is an integer from 1 to N−1, where N is the number of pulses in the quasi-periodic pulse sequence. The detection of the pulse may be accomplished by a correlation algorithm, such as a convolution algorithm.

In block 808, the detector 708 determines whether the quasi-periodic pulse sequence was detected based on the analysis pursuant to block 806. If the quasi-periodic pulse sequence was not detected, which could be the case where the initial or reference pulse detected was not part of the intended quasi-periodic pulse sequence, the detector 708 then selects another sample associated with another pulse in the received signal (block 810). From block 810, the method 800 proceeds to block 804 and then to block 806 in order to attempt to detect intended quasi-periodic pulse sequence. If, on the other hand, in block 808 the detector 708 determines that the quasi-periodic pulse sequence was detected, then the detector provides timing information associated with the detected quasi-periodic pulse sequence to the frame detector 710 for detection of the corresponding frame (block 812).

Figure 9:
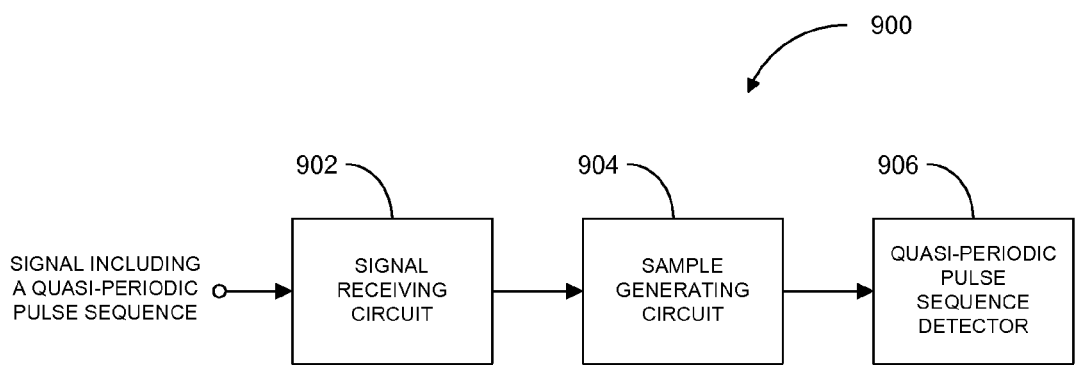
FIG. 9 illustrates a block diagram of an exemplary apparatus for processing a signal in accordance with another aspect of the disclosure.

FIG. 9 illustrates a block diagram of another exemplary receiver 900 in accordance with another aspect of the disclosure. The receiver 900 comprises a signal receiving circuit 902, a sample generating circuit 904, and a quasi-periodic pulse sequence detector 906. The signal receiving circuit 902 is adapted to receive a signal including a quasi-periodic pulse sequence based on a substantially periodic pulse sequence. The sample generating circuit 904 is adapted to generate samples of the received signal. And, the quasi-periodic pulse sequence detector 906 is adapted to detect the quasi-periodic pulse sequence in the received signal by analyzing samples of the received signal.

Figure 10:
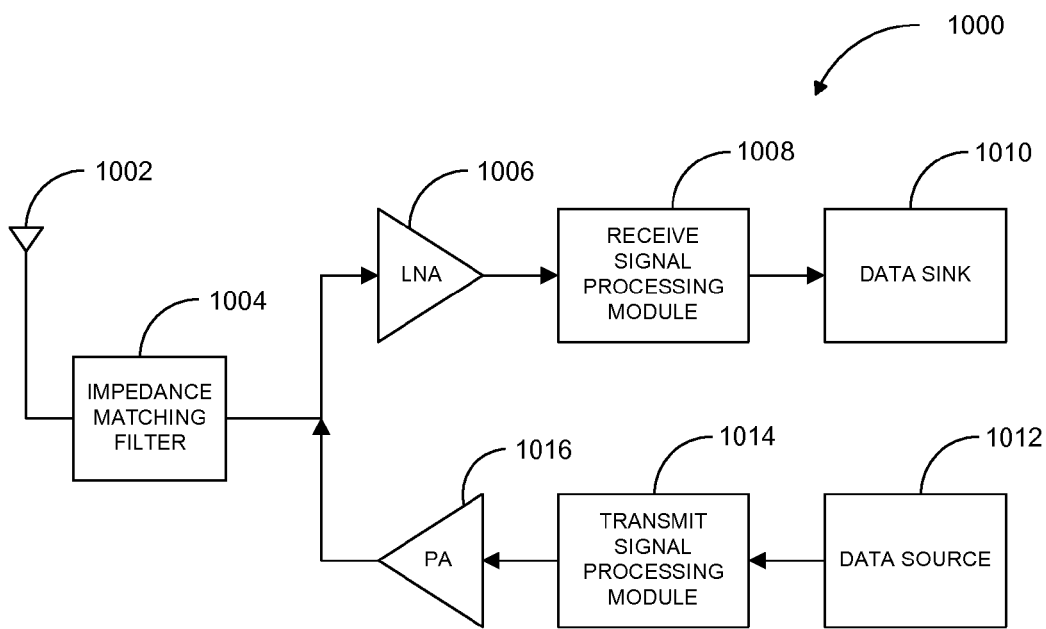
FIG. 10 illustrates a block diagram of an exemplary communication device in accordance with another aspect of the disclosure.

FIG. 10 illustrates a block diagram of an exemplary communication device 1000 in accordance with another aspect of the disclosure. The communication device 1000 may be one exemplary implementation of a communication device that uses any of the apparatuses previously discussed to transmit and detect one or more quasi-periodic pulse sequences. In particular, the communication device 1000 comprises an antenna 1002, an impedance matching filter 1004, a low noise amplifier (LNA) 1006, a receive signal processing module 1008, a data sink 1010, a data source 1012, a transmit signal processing module 1014, and a power amplifier (PA) 1016.

With regard to the communication device 1000 operating as a receiver, an RF signal is picked up by the antenna 1002 and applied to the LNA 1006 by way of the impedance matching filter 1004. The LNA 1006 amplifies the received RF signal. The pulse demodulator 1008 process the received signal, for example, by generating samples thereof, detecting quasi-periodic pulse sequences by analyzing the samples, detecting frames based on the detection of the quasi-periodic pulse sequences, and extracting data from the frames. The extracted data is then provided to the data sink 1010. A data sink 1010 may then perform one or more defined operations based on the received data. For example, the data processor may include a microprocessor, a microcontroller, a reduced instruction set computer (RISC) processor, a display, a game, an audio device adapted to process audio data, such as a headset, including a transducer such as speakers, a medical device, a shoe, a watch, a robotic or mechanical device responsive to the data, a user interface adapted to generate an indication, such as a display, one or more light emitting diodes (LED), etc.

With regard to the communication device 1000 operating as a transceiver, data is generated by the data source 1012. The transmit signal 1014 forms an RF transmit signal including frames by inserting one or more quasi-periodic pulse sequences in a preamble of each frame, inserting the data from the data source 1012 in the data payload of each frame, and pulse modulating each frame. The PA 1016 amplifies the RF transmit signal. The antenna 1002 receives the RF transmit signal from the PA 1016 via the impedance matching filter 1004, and radiates the RF transmit signal into the wireless medium for transmission to a destination communication device. The data source 1012 may be generated by a sensing device comprising a sensor adapted to sense a parameter and provide a signal indicative of the sensed parameter, a microprocessor, a microcontroller, a RISC processor, a keyboard, a pointing device such as a mouse or a track ball, an audio device, such as a headset, including a transducer such as a microphone, a game, a medical device, a shoe, a robotic or mechanical device that generates data, a user interface, such as a touch-sensitive display, a user device etc.

Figure 11A:
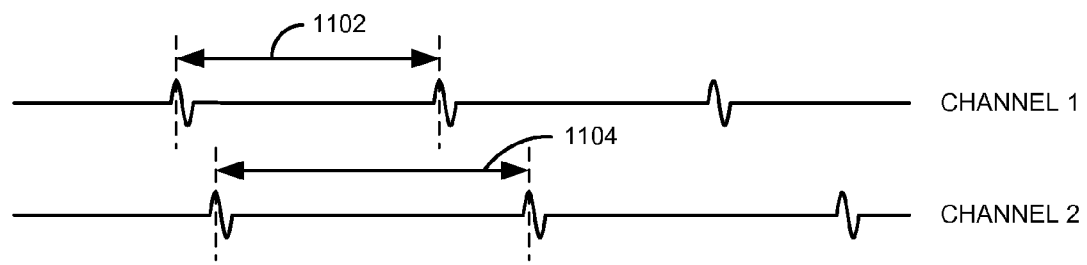
FIGS. 11A-D illustrate timing diagrams of various pulse modulation techniques in accordance with another aspect of the disclosure.

FIG. 11A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 1102. Conversely, pulses for channel 2 have a pulse repetition frequency (PRF) corresponding to a pulse-to-pulse delay period 1104. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF)). Conversely, a channel supporting relatively high data rates (e.g., on the order of a several megabits per second or Mbps) may employ a correspondingly higher pulse repetition frequency (PRF).

Figure 11B:
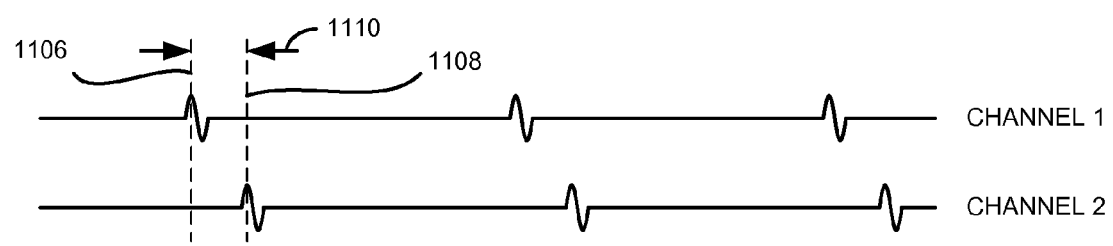

FIG. 11B illustrates different channels (channels 1 and 2) defined with different pulse positions or offsets as an example of a modulation that may be employed in any of the communications systems described herein. Pulses for channel 1 are generated at a point in time as represented by line 1106 in accordance with a first pulse offset (e.g., with respect to a given point in time, not shown). Conversely, pulses for channel 2 are generated at a point in time as represented by line 1108 in accordance with a second pulse offset. Given the pulse offset difference between the pulses (as represented by the arrows 1110), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 11C:
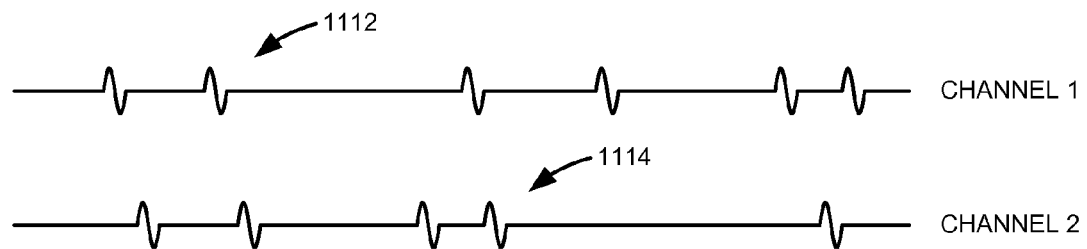

FIG. 11C illustrates different channels (channels 1 and 2) defined with different timing hopping sequences that may be employed in any of the communications systems described herein. For example, pulses 1112 for channel 1 may be generated at times in accordance with one time hopping interval while pulses 1114 for channel 2 may be generated at times in accordance with another time hopping interval. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 11D:
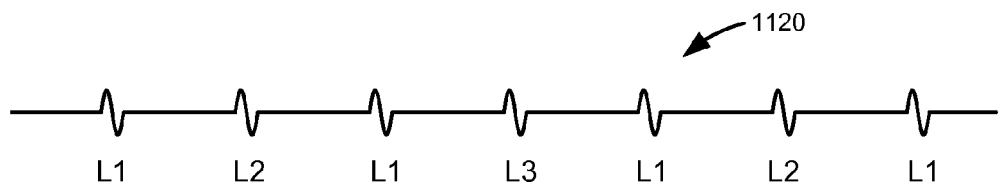

FIG. 11D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulses for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

Figure 12:
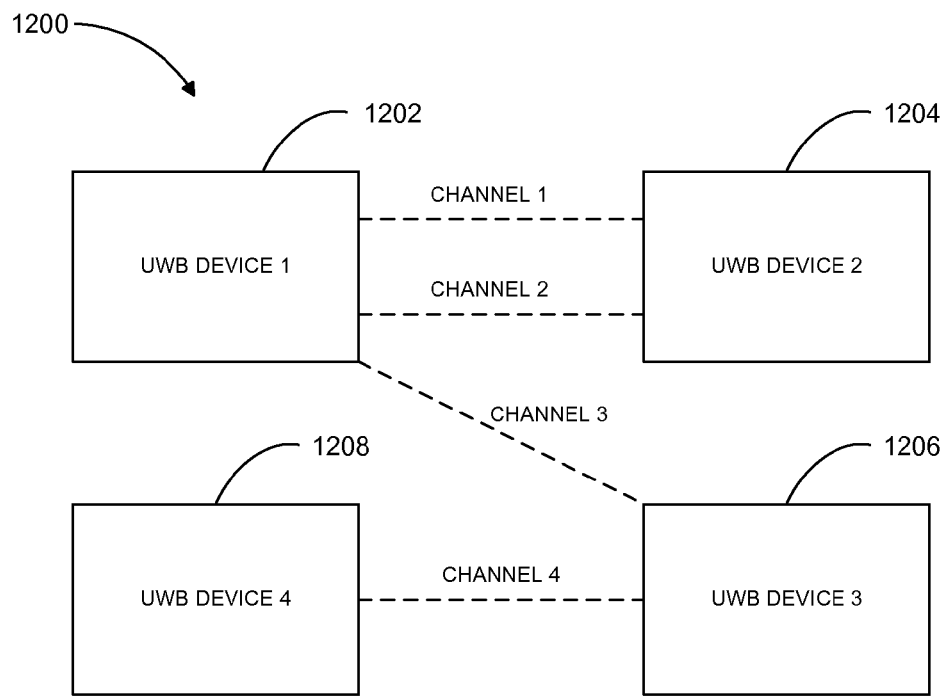
FIG. 12 illustrates a block diagram of various communication devices communicating with each other via various channels in accordance with another aspect of the disclosure.

FIG. 12 illustrates a block diagram of various ultra-wide band (UWB) communications devices communicating with each other via various channels in accordance with another aspect of the disclosure. For example, UWB device 1 1202 is communicating with UWB device 2 1204 via two concurrent UWB channels 1 and 2. UWB device 1202 is communicating with UWB device 3 1206 via a single channel 3. And, UWB device 3 1206 is, in turn, communicating with UWB device 4 1208 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, gaming device, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping intervals. In some aspects concurrent channels may be established based on pulse repetition frequencies, pulse positions or offsets, and time hopping intervals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including instructions executable by an apparatus and related data) and other data may reside in a data memory such as RAM memory, flash memory, ROM memory, EPROM memory, EEPROM memory, registers, a hard disk, a removable disk, a CD-ROM, or any other form of computer readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials. The computer readable medium may store non-transitory data. Additionally, the computer readable medium may also store transitory data, such as signal data.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of processing a signal, comprising: receiving the signal; generating samples of the received signal; and detecting a quasi-periodic pulse sequence in the received signal by analyzing the samples of the received signal, wherein the quasi-periodic pulse sequence is based on a substantially periodic pulse sequence having an associated pulse period, wherein the quasi-periodic pulse sequence comprises:
   a plurality of adjacent pulses each separated from each other by the pulse period and one or more adjacent pulses separated from each other by twice the pulse period, wherein only a single pulse of the adjacent pulses resides in each interval of periodic pulse intervals due to one or more pulses having been deleted, and wherein the periodic pulse intervals have an associated second period greater than the associated pulse period of the substantially periodic pulse sequence, or
   a plurality of adjacent pulses each separated from each other by the pulse period and one or more adjacent pulses separated from each other by a defined amount less than the pulse period, wherein only a single pulse of the adjacent pulses resides in each interval of periodic pulse intervals due to one or more pulses having been deleted, and wherein the periodic pulse intervals have an associated second period less than the associated pulse period of the substantially periodic pulse sequence.

2. The method of claim 1, wherein detecting the quasi-periodic pulse sequence comprises: determining a first sample of the generated samples associated with a first pulse in the received signal; and performing a first analysis of samples of the generated samples based on the first sample and the pulse period associated with the substantially periodic pulse sequence.

3. The method of claim 2, wherein detecting the quasi-periodic pulse sequence further comprises: determining whether the first analysis of the samples results in the detection of the quasi-periodic pulse sequence; determining a second sample of the generated samples associated with a second pulse in the received signal if the first analysis did not result in the detection of the quasi-periodic pulse sequence; and performing a second analysis of samples of the generated samples based on the second sample and the pulse period associated with the substantially periodic pulse sequence.

4. The method of claim 2, wherein performing the first analysis comprises analyzing samples of the generated samples that are integer multiple of the pulse period from the first sample.

5. The method of claim 1, further comprising detecting a frame based on the detection of the quasi-periodic pulse sequence, wherein the frame comprises a preamble including the quasi-periodic pulse sequence and a data payload.

6. The method of claim 5, wherein detecting the frame is based on timing information associated with the detection of the quasi-periodic pulse sequence.

7. The method of claim 5, further comprising extracting data from the frame by analyzing samples of the received signal within the data payload of the frame.

8. An apparatus for processing a signal, comprising: a receiver adapted to receive the signal; a sample generator adapted to generate samples of the received signal; and a quasi-periodic sequence detector adapted to detect a quasi-periodic pulse sequence in the received signal by analyzing the samples of the received signal, wherein the quasi-periodic pulse sequence is based on a substantially periodic pulse sequence having an associated pulse period, wherein the quasi-periodic pulse sequence comprises:
   a plurality of adjacent pulses each separated from each other by the pulse period and one or more adjacent pulses separated from each other by twice the pulse period, wherein only a single pulse of the adjacent pulses resides in each interval of periodic pulse intervals due to one or more periodic pulses having been deleted, and wherein the periodic pulse intervals have an associated second period greater than the associated pulse period of the substantially periodic pulse sequence, or
   a plurality of adjacent pulses each separated from each other by the pulse period and one or more adjacent pulses separated from each other by a defined amount less than the pulse period, wherein only a single pulse of the adjacent pulses resides in each interval of periodic pulse intervals due to one or more pulses having been deleted, and wherein the periodic pulse intervals have an associated second period less than the associated pulse period of the substantially periodic pulse sequence.

9. The apparatus of claim 8, wherein the quasi-periodic sequence detector is adapted to: determine a first sample of the generated samples associated with a first pulse in the received signal; and perform a first analysis of samples of the generated samples based on the first sample and the pulse period associated with the substantially periodic pulse sequence.

10. The apparatus of claim 9, wherein the quasi-periodic sequence detector is further adapted to: determine whether the first analysis of the samples results in the detection of the quasi-periodic pulse sequence; determine a second sample of the generated samples associated with a second pulse in the received signal if the first analysis did not result in the detection of the quasi-periodic pulse sequence; and perform a second analysis of samples of the generated samples based on the second sample and the pulse period associated with the substantially periodic pulse sequence.

11. The apparatus of claim 9, wherein the quasi-periodic sequence detector is further adapted to analyze samples of the generated samples that are integer multiple of the pulse period from the first sample.

12. The apparatus of claim 8, further comprising a frame detector adapted to detect a frame based on the detection of the quasi-periodic pulse sequence, wherein the frame comprises a preamble including the quasi-periodic pulse sequence and a data payload.

13. The apparatus of claim 12, wherein the frame detector is adapted to detect the frame based on timing information associated with the detection of the quasi-periodic pulse sequence.

14. The apparatus of claim 12, further comprising a data extractor adapted to extract data from the frame by analyzing samples of the received signal within the data payload of the frame.

15. An apparatus for processing a signal, comprising: means for receiving the signal; means for generating samples of the received signal; and means for detecting a quasi-periodic pulse sequence in the received signal by analyzing the samples of the received signal, wherein the quasi-periodic pulse sequence is based on a substantially periodic pulse sequence having an associated pulse period, wherein the quasi-periodic pulse sequence comprises:
   a plurality of adjacent pulses each separated from each other by the pulse period and one or more adjacent pulses separated from each other by twice the pulse period, wherein only a single pulse of the adjacent pulses resides in each interval of periodic pulse intervals due to one or more periodic pulses having been deleted, and wherein the periodic pulse intervals have an associated second period greater than the associated pulse period of the substantially periodic pulse sequence, or a plurality of adjacent pulses each separated from each other by the pulse period and one or more adjacent pulses separated from each other by a defined amount less than the pulse period, wherein only a single pulse of the adjacent pulses resides in each interval of periodic pulse intervals due to one or more pulses having been deleted, and wherein the periodic pulse intervals have an associated second period less than the associated pulse period of the substantially periodic pulse sequence.

16. The apparatus of claim 15, wherein the means for detecting the quasi-periodic pulse sequence comprises: means for determining a first sample of the generated samples associated with a first pulse in the received signal; and means for performing a first analysis of samples of the generated samples based on the first sample and the pulse period associated with the substantially periodic pulse sequence.

17. The apparatus of claim 16, wherein the means for detecting the quasi-periodic pulse sequence further comprises: means for determining whether the first analysis of the samples results in the detection of the quasi-periodic pulse sequence; means for determining a second sample of the generated samples associated with a second pulse in the received signal if the first analysis did not result in the detection of the quasi-periodic pulse sequence; and means for performing a second analysis of samples of the generated samples based on the second sample and the pulse period associated with the substantially periodic pulse sequence.

18. The apparatus of claim 16, wherein the means for performing the first analysis comprises means for analyzing samples of the generated samples that are integer multiple of the pulse period from the first sample.

19. The apparatus of claim 15, further comprising means for detecting a frame based on the detection of the quasi-periodic pulse sequence, wherein the frame comprises a preamble including the quasi-periodic pulse sequence and a data payload.

20. The apparatus of claim 19, wherein the means for detecting the frame is adapted to detect the frame based on timing information associated with the detection of the quasi-periodic pulse sequence.

* * * * *